US 7,945,729 B2

(12) United States Patent
Hafner

(10) Patent No.: US 7,945,729 B2
(45) Date of Patent: May 17, 2011

(54) SYSTEM AND METHOD FOR TOLERATING MULTIPLE STORAGE DEVICE FAILURES IN A STORAGE SYSTEM USING HORIZONTAL AND VERTICAL PARITY LAYOUTS

(75) Inventor: James Lee Hafner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 10/997,037

(22) Filed: Nov. 24, 2004

(65) Prior Publication Data

US 2006/0129873 A1   Jun. 15, 2006

(51) Int. Cl.
*G06F 12/00* (2006.01)
*G06F 13/00* (2006.01)
*G06F 13/28* (2006.01)

(52) U.S. Cl. .......... 711/114; 711/E12.002; 711/E12.084
(58) Field of Classification Search .................... 711/114
See application file for complete search history.

(56) References Cited

U.S. PATENT DOCUMENTS

| | | | | | |
|---|---|---|---|---|---|
| 4,205,324 | A | * | 5/1980 | Patel | 714/804 |
| 5,271,012 | A | * | 12/1993 | Blaum et al. | 714/6 |
| 5,459,853 | A | * | 10/1995 | Best et al. | 711/114 |
| 5,513,192 | A | * | 4/1996 | Janku et al. | 714/804 |
| 6,101,615 | A | * | 8/2000 | Lyons | 714/6 |
| 6,158,017 | A | * | 12/2000 | Han et al. | 714/6 |
| 6,327,672 | B1 | * | 12/2001 | Wilner | 714/6 |
| 6,353,895 | B1 | | 3/2002 | Stephenson | 714/5 |
| 6,453,428 | B1 | | 9/2002 | Stephenson | 714/6 |
| 6,502,166 | B1 | * | 12/2002 | Cassidy | 711/114 |
| 6,530,004 | B1 | * | 3/2003 | King et al. | 711/165 |
| 6,643,822 | B1 | * | 11/2003 | Murthy | 714/805 |
| 6,792,391 | B1 | * | 9/2004 | Nanda | 702/185 |
| 6,848,022 | B2 | * | 1/2005 | Nanda | 711/114 |
| 2003/0126523 | A1 | * | 7/2003 | Corbett et al. | 714/718 |
| 2003/0196023 | A1 | * | 10/2003 | Dickson | 711/1 |

(Continued)

FOREIGN PATENT DOCUMENTS

CN   200410004288.6   2/2004

(Continued)

OTHER PUBLICATIONS

Charles M. Kozierok; "RAID Level 6"; The PC Guide; Site Version 2.2.0; Apr. 17, 2001.; http://www.pcguide.com/ref/hdd/perf/raid/levels/singleLevel6-c.html.*

(Continued)

*Primary Examiner* — Matt Kim
*Assistant Examiner* — Christopher D Birkhimer
(74) *Attorney, Agent, or Firm* — Jon A. Gibbons; Fleit Gibbons Gutman Bongini & Bianco PL

(57) ABSTRACT

A fault-tolerant system for storage arrays that stored parity values both on separate disks from the data elements (horizontally aligned) and on the same disks as the data elements (vertically aligned), a so-called horizontal-vertical code or HoVer code. The fault-tolerant system has embodiments that are supported on a variety of array sizes and has significant flexibility in parameter selection. Certain embodiments can tolerate all combinations of T failed disks and, among those, some embodiments can tolerate many instances of more than T failures. The fault-tolerant system has efficient XOR-based encoding, recovery, and updating algorithms and has simple redundancy formulas.

11 Claims, 9 Drawing Sheets

U.S. PATENT DOCUMENTS

2004/0078642 A1     4/2004    Nanda ............................... 714/6
2004/0260868 A1*   12/2004    Sit et al. ........................ 711/108

FOREIGN PATENT DOCUMENTS

JP            2000148409 A     11/1998

OTHER PUBLICATIONS

"RAID-Definitions"; Oct. 23, 2003; p. 4; http://web.archive.org/web/20031023132300/http://linux.cudeso.be/raid.php#raid6.*

Paul Massiglia; "The RAID book: A Storage System Technology Handbook"; 1997; pp. 139-140.*

Paul Massiglia; "The RAID book: A Storage System Technology Handbook"; 1997; p. 140.*

Paul Massiglia, "The RAID Book: A Storage System Technology Handbook", 6th Edition, Feb. 1997, pp. 137-140.*

Guillermo A. Alvarez et al., ("Tolerating Multiple Failures in RAID Architectures with Optimal Storage And Uniform Declustering"), Interntional Symposium On Computer Architecture, 1997, pp. 62-72, http://delivery.acm.org/10.1145/270000/264132/p62-alvarez.pdf?key1=264132&key2=1711781721&coll=GUIDE&dl=GUIDE&CFID=85337343&CFTOKEN=44364468.*

S. Mishra et al., "Dual-Crosshatch Disk Array: A highly reliable Hybrid-RAID architecture," Proceedings of the 24th International Conference on Parallel Processing, 2002.

"I/O Considerations for Database Performance," An MTI Technology Corporation White Paper, available on Nov. 23, 2004, at: http://66.102.7.104/search?q=cache: YUj7NF0T0a8J:db.ittoolbox.com/browse.asp%3Fc%3DDBPeerPublishing%26r%3D/pub/JB050202.pdf+I/O+Considerations+for+Database+Performance&hl=en&ie=UTF-8.

M. Cohen et al., "Optimal and Pessimal Orderings of Steiner Triple Systems in Disk Arrays," Sep. 22, 2000.

* cited by examiner

SYSTEM AND METHOD FOR TOLERATING MULTIPLE STORAGE DEVICE FAILURES IN A STORAGE SYSTEM USING HORIZONTAL AND VERTICAL PARITY LAYOUTS

FIELD OF THE INVENTION

The present invention relates to the field of data storage, and particularly to disk array systems. More specifically, this invention pertains to a method for constructing disk array systems that tolerate many combinations of failed storage devices without loss of data.

BACKGROUND OF THE INVENTION

Computer systems utilize data redundancy schemes such as parity computation to protect against loss of data on a storage device. A redundancy value is computed by calculating a function of the data of a specific word size, also referenced as a data element, across a quantity of similar storage devices, also referenced as data drives. One example of such redundancy is exclusive OR (XOR) parity that is computed as the binary sum of the data.

The redundancy values, hereinafter referenced as parity values, are stored on a plurality of storage devices in locations referenced as parity elements. In the case of a storage device failure that causes a loss of parity element values, the parity values can be regenerated from data stored on one or more of the data elements. Similarly, in the case of a storage device failure that causes a loss of data element values, the data values can be regenerated from the values stored on one or more of the parity elements and possibly one or more of the other non-failed data elements.

In Redundant Arrays of Independent Disk (RAID) systems, data values and related parity values are striped across disk drives. In storage subsystems that manage hard disk drives as a single logical direct (DASD) or network attached (NASD) storage device, the RAID logic is implemented in an array controller of the subsystem. Such RAID logic may also be implemented in a host system in software or in some other device in a network storage subsystem.

Disk arrays, in particular RAID-3 and RAID-5 disk arrays, have become accepted designs for highly available and reliable disk subsystems. In such arrays, the XOR of data from some number of disks is maintained on a redundant disk (the parity drive). When a disk fails, the data on it can be reconstructed by exclusive-ORing the data and parity on the surviving disks and writing this data into a spare disk. Data is lost if a second disk fails before the reconstruction is complete.

RAID-6 is an extension of RAID-5 that protects against two drive failures. There are many other RAID algorithms that have been proposed to tolerate two drive failures: for example, Reed-Solomon [reference is made to I. S. Reed, et. al., "Polynomial codes over certain finite fields," Journal of the Society for Industrial and Applied Mathematics, vol. 8, pp. 300-304, 1960], Blaum-Roth [reference is made to M. Blaum, et. al., "On lowest density MDS codes," IEEE Transactions on Information Theory, vol. 45, pp. 46-59, 1999], EvenOdd [reference is made to M. Blaum, et. al., "EVENODD: an efficient scheme for tolerating double disk failures in RAID architectures," IEEE Transactions on Computers, vol. 44, pp. 192-202, 1995], Row-Diagonal Parity [reference is made to P. Corbett, et al., "Row-diagonal parity technique for enabling recovery from double failures in a storage array," (U.S. patent application US 20030126523)], XCode [reference is made to L. Xu, et. al., "X-code: MDS array codes with optimal encoding," IEEE Transactions on Information Theory, pp. 272-276, 1999], ZZS [reference is made to G. V. Zaitsev, et. al., "Minimum-check-density codes for correcting bytes of errors," Problems in Information Transmission, vol. 19, pp. 29-37, 1983], BCP [reference is made to S. Baylor, et al., "Efficient method for providing fault tolerance against double device failures in multiple device systems," (U.S. Pat. No. 5,862,158)], LSI [reference is made to A. Wilner, "Multiple drive failure tolerant raid system," (U.S. Pat. No. 6,327,672 B1)], Samsung [reference is made to T-D Han, et. al., "Method for storing parity and rebuilding data contents of failed disks in an external storage subsystem and apparatus thereof", U.S. Pat. No. 6,158,017] and Nanda [reference is made to S. Nanda, "Method and system for disk fault tolerance in a disk array" [reference is made to US patent application US 2004/0078642 A1]. There have been a few additional extensions that protect against multiple drive failures: for example, Reed-Solomon [referenced above], and EO+ [reference is made to M. Blaum, et. al., "MDS array codes with independent parity symbols," IEEE Transactions on Information Theory, vol. 42, pp. 529-542, 1996].

More recently, storage systems have been designed wherein the storage devices are nodes in a network (not simply disk drives). Such systems may also use RAID techniques for data redundancy and reliability. The present invention is applicable to these systems as well. Though the description herein is exemplified using the disk array, it should be clear to one skilled in the art how to extend the invention to the network node application or other systems built from storage devices other than disks.

Although conventional RAID technology has proven to be useful, it would be desirable to present additional improvements. As can be seen by the various conventional RAID techniques that have been used or proposed, none has been a perfect solution to the variety of requirements that the computer industry places on a storage subsystem. Many conventional systems are complex, requiring extensive computer overhead. Furthermore, many conventional systems have excessive disk IO requirements for certain operations. Others require a large number of drives in the system, and the use of more drives reduces overall system reliability. Many conventional codes tolerate only two failures. Others have constraints on the parameters of the code that are impractical in real systems or impose performance penalties. In addition, many conventional codes that tolerate T failures (that is, all possible combinations of T drives failing), cannot tolerate any combination of more than T drives failing. Conventional RAID techniques that can tolerate additional combinations of failures beyond T have a higher reliability than those that do not.

What is therefore needed is a system, a computer program product and an associated method for enabling recovery from failures in a storage system that is simple, can handle many failure cases, and has reasonable performance and parametric flexibility. The need for such a solution has heretofore remained unsatisfied.

SUMMARY OF THE INVENTION

The present invention satisfies this need, and presents a system, a computer program product, and an associated method (collectively referred to herein as "the system" or "the present system") for tolerating multiple storage device failures in a storage system using horizontal and vertical parities, thus enabling efficient implementation of operations required of a storage subsystem.

A primary feature of the invention is the special data and parity layout that combines features from the two basic families of codes proposed for storage systems. In many erasure codes for storage systems, all the parity values are stored on separate disks from all the data from which they are computed. This is the case, for example, in Reed-Solomon, Blaum-Roth, Even-Odd, Row-Diagonal Parity, LSI (all referenced above) and many others. Such codes are hereinafter referred to as "horizontal" codes because the parity values are placed in a horizontal relationship to the data values. In most other erasure codes, all the parity values are stored on disks with the data, as is the case for the X-code, ZZS, and BCP codes. Such codes are hereinafter referred to as "vertical" codes because the parity values are placed in a vertical relationship (vertically aligned on the same disks) as data values. This invention places some of the parity values on separate disks from the data from which it is computed (in a horizontal relationship) and additional parity values on the disks with the data (in a vertical relationship). Hereinafter, the codes of this invention are referred to as "horizontal-vertical" codes or "HoVer" codes for brevity. Such codes are said to have a "HoVer data/parity layout" or "HoVer layout" for brevity.

One of the codes in Samsung [reference is made to T-D Han, et. al., "Method for storing parity and rebuilding data contents of failed disks in an external storage subsystem and apparatus thereof", U.S. Pat. No. 6,158,017], the DH2 code, has the same HoVer property as the present invention. However, it has three limitations not applicable to the present invention. First, it can tolerate only 2 disk failures, whereas the present invention has at least two constructions that tolerate all combinations of 3 disk failures and a construction that tolerates all combinations of 4 disk failures. Second, the DH2 code cannot tolerate any combination of 3 disk failures, whereas, special choices of the design parameters for the 2-fault tolerant embodiment of the present system can tolerate some combinations of 3 failures. More generally, for the T-fault tolerant embodiments of the present system, some parameter choices may tolerate certain combinations of T+1 or more failures. Third, the DH2 code is restricted to p+1 disks and p−2 rows of data and one row of parity where p is a prime number. The preferred embodiment of the 2-fault tolerant embodiment of the present invention has no such restriction on the array size and relaxes the restriction on the number of rows.

As referred to in the previous paragraph, another feature of the present system is the flexibility of the design parameters. Most erasure codes divide the data on the disks into chunks or elements and use these elements as the building blocks for computing parity values. The number of data elements per disk we refer to as the number of data rows. The larger the number of data rows, the more expensive are certain operations including costs for rebuild or recovery when disks are lost. Such expensive costs occur both in number and size of IOs needed to read recovery data and parity and in the XOR or other mathematical formulas used to recompute lost data. In the present state of the art, when the number of data disks increases, the number of rows also increases. More precisely, current systems require either a fixed relationship on the number of rows as a function of the number of data disks (as in the vertical codes such as X-code, ZZS, BCP referenced above or the Samsung codes referenced above) or a lower bound on the number of rows as a function of the number of data disks (as in the horizontal codes Blaum-Roth, EvenOdd, or Row-Diagonal Parity codes referenced above). The present invention has the more desirable feature that the number of rows is bounded above by a function of the number of data disks. That is, for any fixed number of data disks, the number of rows can be adjusted downward from a maximum value to any other value. Such downward adjustments marginally reduce the overall efficiency (or rate) of the code, but improves certain performance and reliability characteristics.

The Nanda codes [reference is made to S. Nanda, "Method and system for disk fault tolerance in a disk array" (US patent application US 2004/0078642 A1)] have a data/parity layout that is similar to the HoVer layout. This code has few restrictions on the parameters (number of rows and disks) however it differs from the present invention in a number of ways. First, it applies only to the 2-fault tolerant situations. Second, it has large variations in the number of data elements that contribute to each parity element computation: for example, in some cases only one data element touches a given parity element (that is, is a mirror of the data element). Such large variations can introduce undesirable performance imbalances in the storage system. Third, the present invention imposes the restriction that $h+v \leq 2=T$ whereas the Nanda code has two horizontal parity strips (h=2) and one vertical parity row (v=1) so that the sum of these two values exceeds the fault-tolerance value of 2. Finally, the Nanda code is significantly less space efficient than a corresponding 2-fault tolerant embodiment of the present invention.

In yet another feature of the present system; the array size can expand beyond a minimum without changing the complexity of the computer overhead. In fact, this is another perspective on the flexibility of the number of rows. The present system can, in general, for a fixed number of rows support any number of data disks above a certain number that is a function of the number of rows. Expanding the size of the array does not increase significantly the overall costs of recovery, but provides implementation flexibility. In addition, with some embodiments, a larger number of disks for a fixed row count can improve the reliability by tolerating certain combinations of failures above the minimum fault-tolerance of the code. Examples are given in the detailed description below.

A feature of the present system is that there are embodiments that can tolerate as many as all combinations of T failures, for some parameter T. Another feature of the invention is that there are embodiments such that every data element is redundantly stored in exactly T parity elements; that is, the data out-degree for each data element is exactly T. This is an optimum value for any code that tolerates all combinations of T failures. Consequently, the present system has embodiments with optimal update IO requirements among codes of high fault-tolerance. Other embodiments of the present system are possible that relax this constraint.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
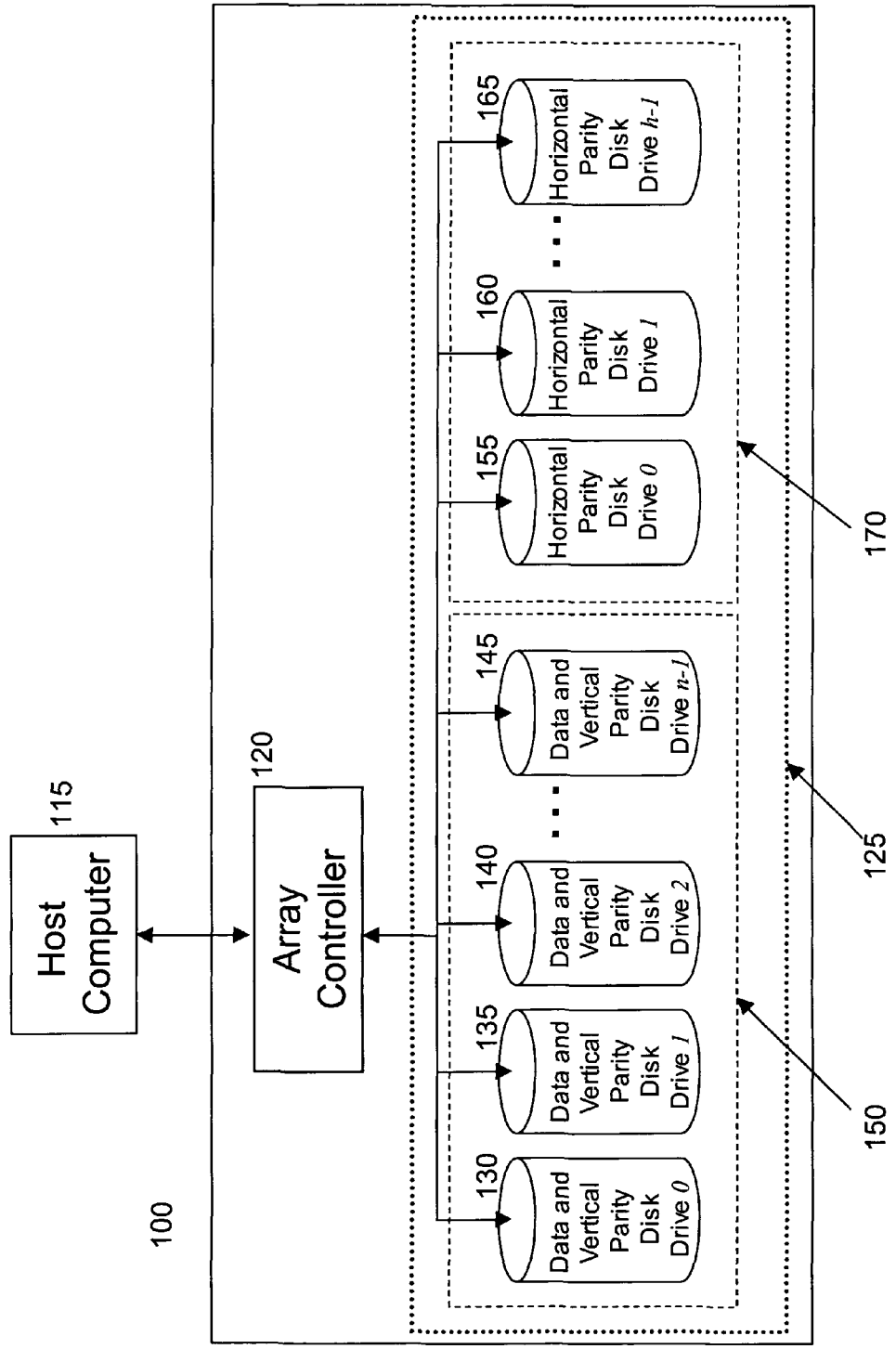
FIG. 1 is a schematic illustration of an exemplary environment in which a system and associated method for implementing a storage redundancy scheme wherein HoVer data/parity layouts may be deployed.

FIG. 1 illustrates an exemplary environment (data storage system 100) in which a system and associated method (collectively referred to as "system" 100) can be used for implementing a fault-tolerant storage system with horizontal and vertical parity layouts. A host computer 115 is connected to an array controller 120 of system 100. The host computer 115 stores data in an array of N=n+h disk drives 125 comprising n data and vertical parity disk drives: disk drive 0, 130, disk drive 1, 135, disk drive 2, 140, through disk drive n−1, 145 (referenced collectively as disk drives 150) and further comprising h horizontal parity disk drives: disk drive 0, 155, disk drive 1, 160, through disk drive h−1, 165 (referenced collectively as horizontal parity drives 170). Vertical parity is stored in the n data and vertical parity disk drives 150 along with the host data. Horizontal parity is stored in the h horizontal parity disk drives 170.

Figure 2:
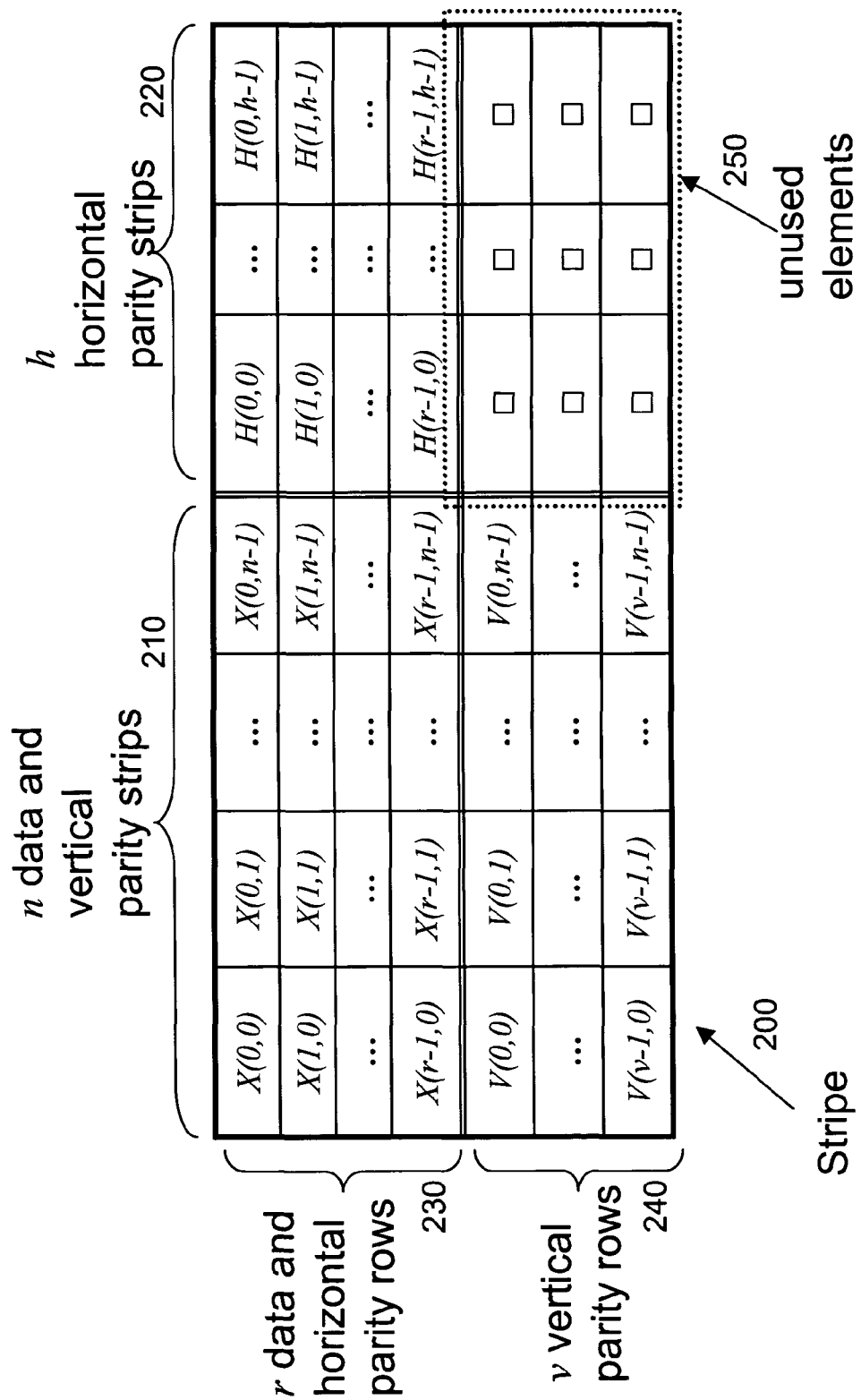
FIG. 2 is a diagram illustrating an exemplary layout showing a two-dimensional data and parity HoVer layout in the system of FIG. 1.

With further reference to FIG. 2, a general layout of data, vertical parity and horizontal parity for the data storage system 100 of FIG. 1 is shown. A portion of each data and vertical parity disk drive 150 is selected and comprises the data and vertical parity strips 210; a portion of each horizontal parity disk drive 170 is selected and comprises the horizontal parity strips 220 and the unused elements 250. Collectively these portions, excluding the unused portions, from both sets of disk drives form a stripe 200, or one instance of system 100. The data portion of the stripe 200 is hereinafter referenced as the data substripe. The portion of each disk drive in a stripe is referenced hereinafter as a strip. The data portion of a data and vertical parity strip is referenced hereinafter as a data substrip. The vertical parity portion of a data and vertical parity strip is hereinafter referenced as the vertical parity substrip. The horizontal parity strips 220 also contain unused portions 250; such unused portions may be used to hold additional data or parity values from the same instance of the present invention or data or parity from another instance of the present invention or may be used for other system information or not used at all. Each strip is further divided into the same number r+v of elements, of the same size (e.g., byte, word, block, etc.). The elements of each data substrip are further designated to be data elements labeled X(i,j) ($0 \leq i \leq r-1$, $0 \leq j \leq n-1$) of which there are r such data elements per data substrip; the elements of the vertical parity substrips are V(i,j) ($0 \leq i \leq v-1$, $0 \leq j \leq n-1$) of which there are v such vertical parity elements per vertical parity substrip; the elements of the horizontal parity substrips are H(i,j) ($0 \leq i \leq r-1$, $0 \leq j \leq h-1$) of which there are r such vertical parity elements per horizontal parity strip. There are r·v total unused elements in this exemplary embodiment. The data and horizontal parity elements aligned horizontally in the first r rows form the r data and horizontal parity rows 230; the vertical parity elements aligned horizontally in the next v rows form the v vertical parity rows (excluding the unused elements). The present system imposes the additional constraint h+v≦T where T is the fault tolerance of the code. This constraint allows for implementations of HoVer data/parity layouts with maximal efficiency among such codes.

Other embodiments may place additional data or parity elements in the unused portion of the horizontal parity strips. In addition, other embodiments may place the vertical parity rows first or may permute the rows of any strip, or may convert some vertical or horizontal parity elements into unused elements (for example, by fixing some value for the contents of these elements). The exemplary layout shown in FIG. 2 is the preferred embodiment of system 100.

Many erasure codes in the current state of the art have no vertical parity rows and store parity values only in the horizontal positions (so called "horizontal codes"); this is the case for the Blaum-Roth, EvenOdd, Row-Diagonal Parity, and other codes referenced above. Still other erasure codes in the current state of the art have no horizontal parity strips and store parity values only in the vertical positions (so called "vertical codes"); this is the case for the X-code, BCP, ZZS codes and other codes referenced above. The Samsung DH2 code [reference is made to T-D Han, et. al., "Method for storing parity and rebuilding data contents of failed disks in an external storage subsystem and apparatus thereof" U.S. Pat. No. 6,158,017] has a layout similar to that of FIG. 2 however it has additional limitations. First, it has only one row of vertical parity (v=1) and one strip of horizontal parity (h=1). Second, it restricts the number of data and vertical parity strips to n=p, where p is a prime number; no primality restrictions are placed on the general layout of FIG. 2. Third, the number of data and horizontal parity rows in the DH2 code is fixed at r=p−2; as is shown later, the present invention can relax this constraint allowing for additional parameter flexibility. Fourth, the DH2 code can only recover from two disk failures, whereas the more general layout of the present system can have configurations that can tolerate more failures; examples are given later that tolerate 3 and that tolerate 4 failures. The Nanda codes [reference is made to S. Nanda, "Method and system for disk fault tolerance in a disk array" (US patent application US 2004/0078642 A1)] have a HoVer data/parity layout but has two strips of horizontal parity (h=1) and one row of vertical parity (v=1). These codes can only tolerate two disk failures and so they exceed the constraint h+v≦2 for 2-fault tolerant embodiments of the present system.

It can be seen mathematically that the general layout of the present system in FIG. 2 imposes some necessary relationships on the parameters r, n, h, v in order for the code to tolerate some number T of failed disks. In particular, it must hold that $$r \leq v\frac{n-T}{T-h} \text{ or equivalently,} \tag{1}$$

Depending on the formulas used to compute the vertical and horizontal parities, other restrictions may occur. However, in general, it is the case that if a configuration has the correct fault tolerance for some values of r, n, h, v, then another configuration with the same values for n, h, v can have the same fault tolerance for each value of r'≦r. Similarly, if a configuration has the correct fault tolerance for some values of r, n, h, v, then another configuration with the same values for r, n, h, v can have the same fault tolerance for each value of n'≧n, with at most a small number of exceptions. This flexibility in the parameter selection has significant advantages over the current systems. For all current horizontal codes, the relationship of the number of data rows r and the number of data strips n is either fixed or r is bounded below by some function of n. The Blaum-Roth and EvenOdd codes require r=p−1≧n−1, for some prime number p (similarly, the Row-Diagonal Parity code requires r=p−1≧n). Similar row and array size restrictions also apply to the vertical codes such as X-code, BCP and ZZS. Such restrictions imply that as the array size increases, then so does the number of rows of elements. However, this increase adds performance penalties in two ways. First, it increases the complexity of the formulas required for reconstructing lost elements adding to computational costs and computing overhead. Second, it generally increases the number and size of the disk IOs required to collect the data values and parity values needed for a reconstruction algorithm. Examples of how the present invention improves on the state of the art in this regard are presented later.

Certainly when h=1 and perhaps more generally, embodiments of the present system should exist wherein each data element touches (that is, contributes to the value of) exactly T parity elements. This is the optimal value for any erasure code that tolerates T failed disks. The specific exemplary embodiments given hereinafter all have this property.

It should be clear to those skilled in the art that the present invention can be implemented in multiple stripes on the same disks or on subsets or supersets of the disks of one implementation. It should also be clear that each implementation may have different values for the parameters r, n, h, v and T. Furthermore, it should be clear to one skilled in the art how the unused elements 250 of the layout of FIG. 2 may be used. This unused space may be used to hold meta-data about the array such as the state of the array or logical to physical mappings of the strips to the physical disks; when multiple instances of system 100 are implemented on the same disks, the unused space of one stripe may be overlapped with used space (either data, vertical or horizontal parity elements) of another stripe.

Figure 3:
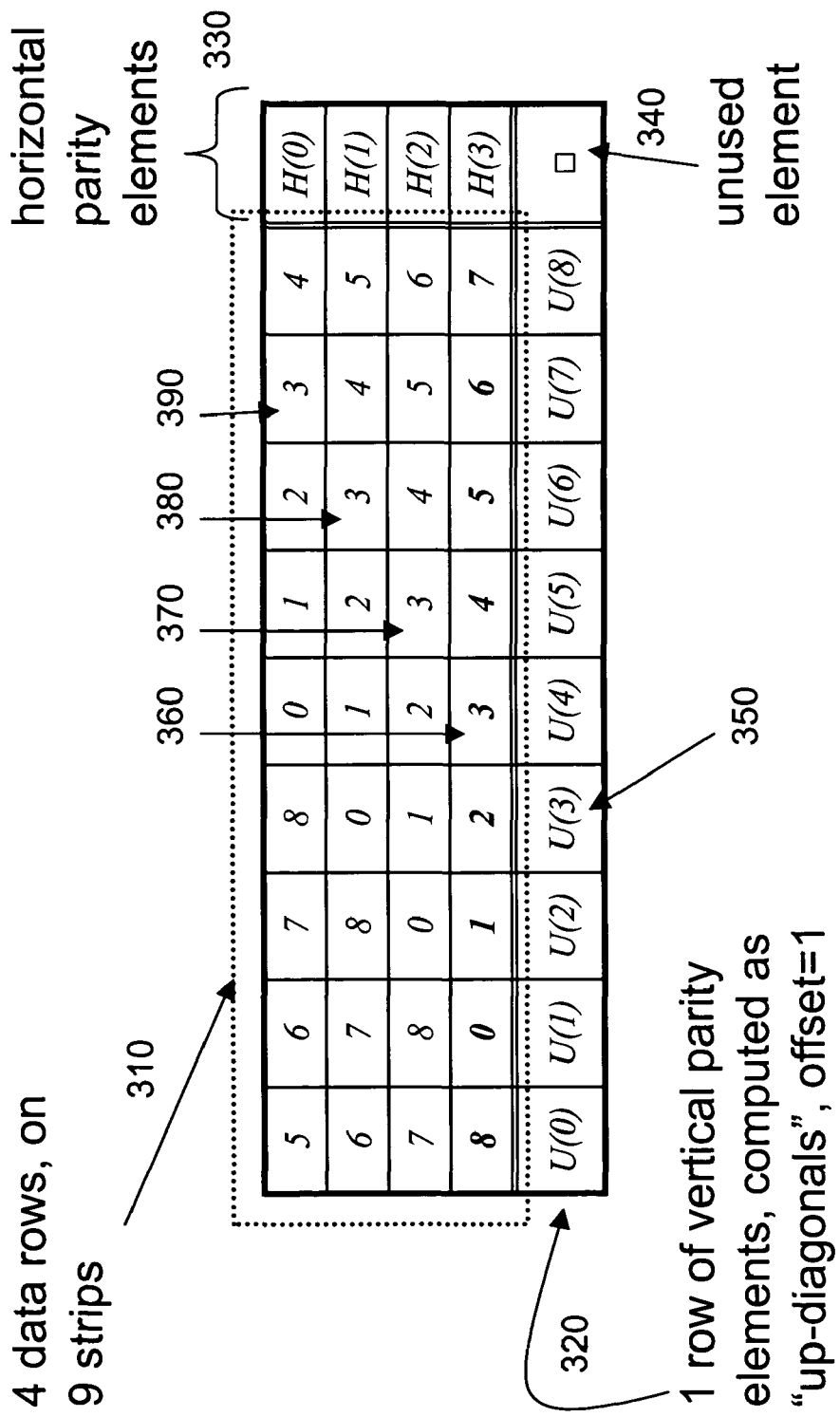
FIG. 3 is a diagram representing an exemplary embodiment of the present system that can tolerate two failures.

FIG. 3 depicts one exemplary embodiment of the present system that can tolerate 2 failed disks and has h=1 and v=1. The configuration is similar to the Samsung DH2 code, though this embodiment does not have the primality restriction on n or the fixed relationship on r imposed by DH2 (in the example of FIG. 3, n=9 and r=4). In this embodiment, stripe 200 comprises one vertical parity row, 320, four data rows, 310 and four horizontal parity elements, 330. There is only one unused data element 340 in the embodiment of FIG. 3. Each horizontal parity element H(i) is computed as the XOR (exclusive OR) of the data elements in its row according to the formula:

$$H(i) = \bigoplus_{j=0}^{n-1} X(i, j). \quad (2)$$

Furthermore, each vertical parity element U(i) is computed as the XOR of the up-diagonal data elements (of slope+1 in the data substripe 310) starting at the data element immediately to the right (offset=1) from the vertical parity element strip, with wrap-around from right to left within the data substripe 310. The notation U(i) is used to suggest "up-diagonal". Mathematically, this is expressed by the formula:

$$U(j) = \bigoplus_{i=0}^{r-1} X(i, \mathrm{mod}(j + r - i, n)) \quad (3)$$

where mod(k, n) represents the value of k modulo n, that is, the smallest non-negative integer remainder of k divided by n.

The graphic in FIG. 3 shows how each data element is mapped to its corresponding vertical parity element U(j). The label in each data element cell corresponds to the strip number j of its vertical parity element U(j). For example, the elements labeled "3", 360,370,380,390, are XORed to form the vertical parity element U(3), 350. This relationship is rotated to the right, with wrap-around from right to left within the data substripe to further generate the other vertical parity elements.

When one data disk fails, the present invention can recover each element on the associated data strip using either a horizontal parity and a set of data elements (from the same row) or a vertical parity and a set of data elements (from the same diagonal). Using a horizontal parity requires reading n−1 data elements and one horizontal parity element and an XOR computation with n summands. On the other hand, using the vertical parity requires reading only r−1 data elements and one parity element and an XOR computation with only r summands. Formula (1) implies that r≦n−2; this means that using the vertical parity values yields more efficient reconstruction methods than using the horizontal parity values under this failure scenario. In contrast and generally, horizontal codes always require at least n−1 data elements and at least one horizontal parity element and XOR computations of at least n summands. The present system then improves on the state of the art in this regard. A similar statement applies for current vertical codes, because they tightly couple the number of rows to the number of data strips.

The embodiment of FIG. 3 has r=4. For the formulas (2) and (3), and for n=9, v=1, h=1 the layout of FIG. 2 produces a valid 2-fault tolerant erasure code for every value of r in the range 1≦r≦5. This exemplifies the flexibility in parameter selection for the invention. As noted the smaller numbers of rows enables more efficient recovery of lost data elements.

The embodiment of FIG. 3 can tolerate any combination of 2 disk failures. However, it is easy to see that by removing the top row, the resulting erasure code can also tolerate some combinations of 3 disk failures. For example, it can loose the horizontal parity strip and any two data strips that are exactly four strips offset. This is easy to see since the two data strips can each be recovered using only vertical parity. In general, as the number of data disks n increases, for a fixed value of r, (or analogously as the number of rows r decreases for a fixed value of n) the number of such combinations of 3 disk failures that can be tolerated increases.

The code exemplified in FIG. 3 when r=1 is similar to a subcode of the so-called RAID51 erasure code. The conventional RAID51 code mirrors a conventional RAID5 code on separate disks and can tolerate all combinations of 3 failures. Removing the mirror of the horizontal parity in a conventional RAID51 code produces a subcode that can tolerate any two failures. In the example of FIG. 3 with r=1, the horizontal parity is just the RAID5 parity of a conventional RAID5 code. The vertical parity is just the mirror (copy) of the data row, with a rotation. There is no mirror of the RAID5 parity, that is, of the horizontal parity. The present system is then similar to the RAID51 subcode except that the mirrored data appears on the same disks as the data substripe, and is rotated one disk to the left. The conventional RAID51 subcode requires 2n+1 disk drives whereas the present system as described requires only n+1 disk drives. This fewer number of required disks required makes this embodiment of the present system more reliable than the conventional 2-fault tolerant subcode of RAID51.

The embodiment of the present invention for which v=1 and h=1 that tolerates all combinations of 2 failed disks and is constructed by formulas (2) and (3) has the following restriction on the parameters r and n:

$$r \leq n - n/pr(n) - 1, \quad (4)$$

where pr(n) represents the smallest prime factor of n. If this condition does not hold, it can be shown that certain pairs of failed strips cannot be reconstructed. Conversely, if this condition holds, then for any combination of a pair of failed strips, there is a set of recurrences that can be used to reconstruct the lost elements and that each such recurrence has a starting point that requires only a single vertical parity element and known (not lost) data elements. Two examples are given in FIG. 4 for the case when n=15 and r=8 which satisfies the bound of formula (4) (because pr(15)=3).

Figure 4:
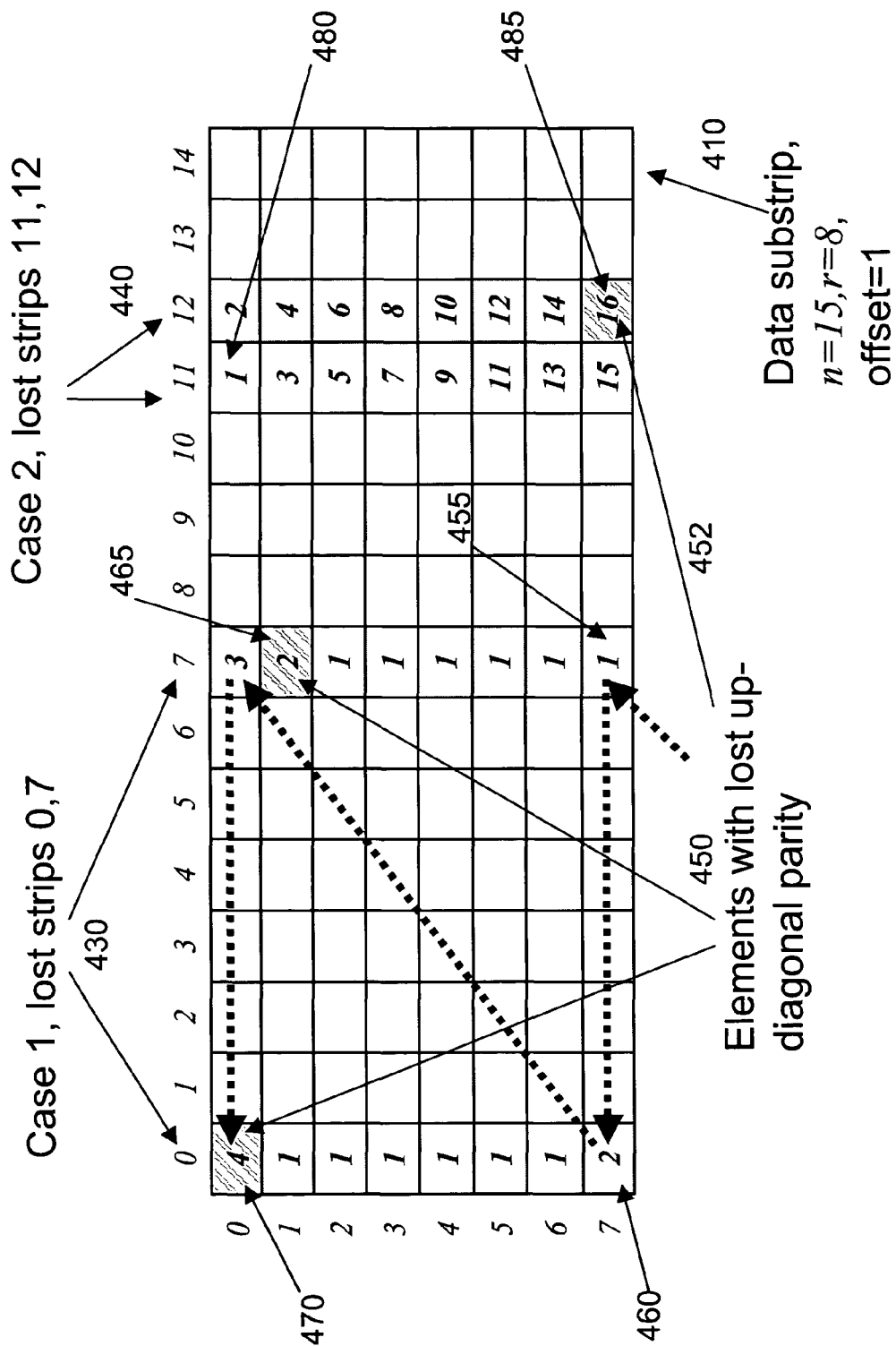
FIG. 4 is a diagram representing two failure scenarios and reconstruction paths for the system of FIG. 3.

FIG. 4 shows only the data substripe 410 for an instance of the embodiment of FIG. 3 when n=15 and r=8, where r is one less than the upper bound 9 of formula (4). Case 1 of FIG. 4 shows data strips 0 and 7, 430, as being lost, which is indicated by the shading. (In Case 1, strips 11 and 12, 440 are assumed to be good). The elements 450 are highlighted to show that the vertical parity corresponding to these elements is assumed lost so that this type of parity cannot be used in any reconstruction method for these special lost data elements. The number in each lost cell is the minimum number of different parity equations, using only a single parity value each, that are required to reconstruct the lost element in that cell. In other words, the number represents the number of steps in a minimal recurrence to reconstruct the element. Even numbered cells are computed at the last step from a horizontal parity element (and related data elements from the same row) and odd numbered cells are computed at the last step from a vertical (up-diagonal) parity element (and related data elements from the corresponding up-diagonal). For example, element 455, with label 1 can be reconstructed from the vertical parity element in strip 6 found by following the dotted up-diagonal path into element 455. Once element 455 has been reconstructed, a horizontal parity element from row 7 can be used to reconstruct the element 460 labeled 2, by following the dotted horizontal path into element 460. Similarly, the dotted up-diagonal path from element 460 to element 465 can now be followed to reconstruct element 465 (in the third step in the recurrence). Finally, element 470 can be reconstructed by following the dotted horizontal path from element 465. Note that for this failure case, many elements (those labeled 1) can be reconstructed in one step from a vertical parity. Each such element labeled 1 is the start of a recurrence; in many cases, these recurrences have length 1 as well, though the example just given shows that longer lengths can occur.

For Case 2, where data strips 11 and 12, 440, are lost (and not strips 0 and 7 as in Case 1), there is only one element 452 whose vertical parity is lost. However, there is only one recurrence that can be used to reconstruct any of the lost data elements. That is, there is only one element 480 labeled 1 that is the start of a recurrence. Every other lost element has to be reconstructed by the recurrence that starts in element 480. Element 485 is the last element in the recurrence and is labeled 16 to indicate that there are 16 steps in the recurrence before this element can be reconstructed.

FIG. 4 shows that for the embodiment of FIG. 3 with formulas (2) and (3) and satisfying condition (4), there is large variation in the costs (length of recurrence) of reconstructing lost data elements that depends heavily on the specific failure instance. In all cases, the worst that occurs is a single long recurrence and in many cases, there are many very short recurrences. This should be compared to the current state of the art for 2-fault tolerant erasure codes in which there are generally only one or two long recurrences for every failure pair. This highlights yet another advantage of the present system, that is, that recovery can be more efficient for the codes of the present system.

Figure 5:
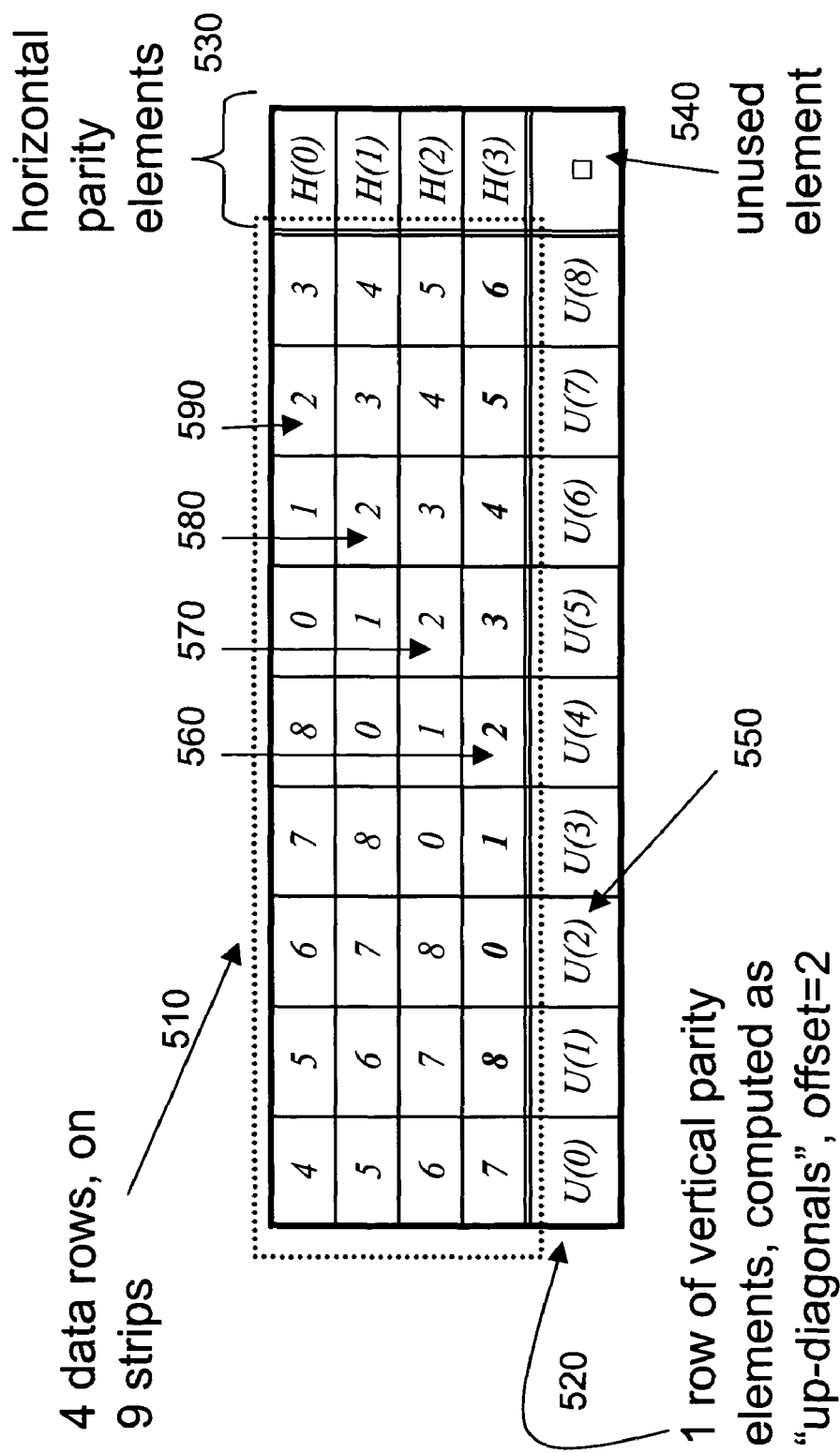
FIG. 5 is a diagram representing an alternative embodiment to that in FIG. 3 that can tolerate two failures.

The embodiment exemplified by FIG. 4 and formula (3) has the vertical parity element placed in the strip immediately to the left of the starting data element of the up-diagonal (the data element in the last data row). Another way to view this is that the starting point of a given up-diagonal for a specific vertical parity element is one strip offset to the right from the strip of the parity element. Other embodiments are also possible and have other advantages. FIG. 5 shows another embodiment similar to that in FIG. 3 but the vertical parity element now starts its up-diagonal offset two strips to the right. As in FIG. 3 each data element of data substripe 510 is labeled by the strip number j of the up-diagonal parity U(j) to which it is related. For example, up-diagonal parity element U(2), 550, is computed from the four data elements labeled "2", 560,570,580,590. It should be clear that other offsets are possible. For an offset value s, the up-diagonal parity formula (3) is modified to the following formula:

$$U(j) = \bigoplus_{i=0}^{r-1} X(i, \mathrm{mod}(j + r - 1 + s - i, n)) \quad (5)$$

However, different offsets limit the range of values for r. For offset s≤n−r, it can be shown that $$r \leq n - s - n/pr(n) \quad (6)$$

when n is not a prime and $$r \leq n - \max(s, 2)$$

when n is a prime number.

Figure 6:
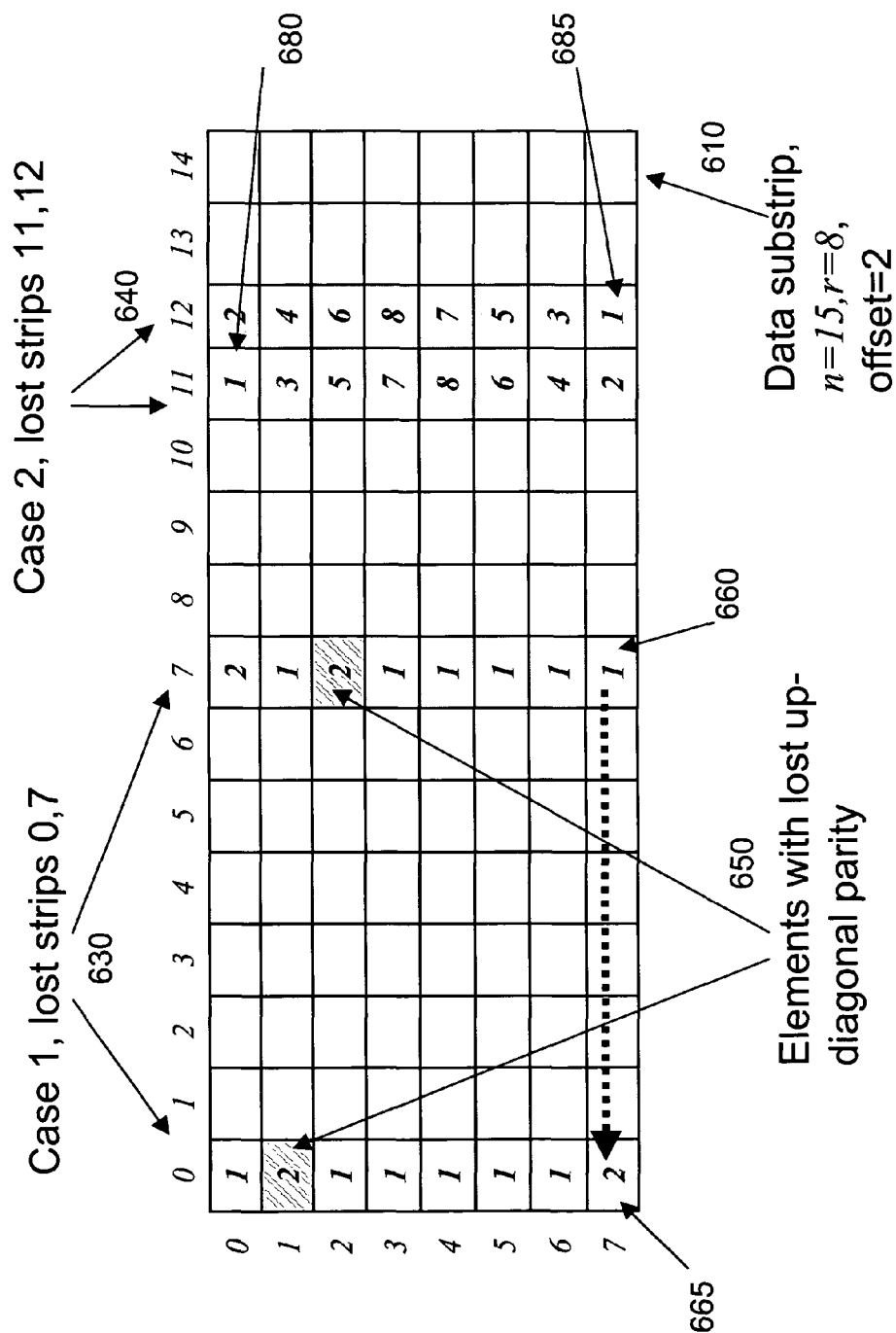
FIG. 6 is a diagram representing two failure scenarios and reconstruction paths for the system of FIG. 5.

FIG. 6 shows the advantage of having alternative choices for the offset value s. When s=1, it was shown in FIG. 4 that some failure scenarios required a single recurrence of maximal length to recover two lost strips of data elements. In FIG. 6, an exemplary data substripe 610 for an instance of the embodiment of FIG. 4 when s=2, n=15 and r=8, the upper bound 8 of formula (6) (because pr(15)=3). Case 1 of FIG. 6 shows data strips 0 and 7, 630, as being lost, which is indicated by the shading. (In Case 1, strips 11 and 12, 640 are assumed to be good). The elements 650 are highlighted to show that the vertical parity corresponding to these elements is assumed lost so that this type of parity cannot be used in any reconstruction method for these special lost data elements. The number in each lost cell is the minimum number of different parity equations, using only a single parity value each, that are required to reconstruct the lost element in that cell. In other words, the number represents the number of steps in a minimal recurrence to reconstruct the element. Even numbered cells are computed at the last step from a horizontal parity element (and related data elements from the same row) and odd numbered cells are computed at the last step from a vertical (up-diagonal) parity element (and related data elements from the corresponding up-diagonal). For example, element 660, with label 1 can be reconstructed from the vertical parity element in strip 5 (because the offset is 2).

Once element 660 has been reconstructed, a horizontal parity element from row 7 can be used to reconstruct the element 665 labeled 2.

For Case 2, where data strips 11 and 12, 640, are lost (and not strips 0 and 7 as in Case 1), there are no elements whose vertical parity is lost (for the offset s=1 in FIG. 4 there was one such element). Furthermore, in contrast to the example in FIG. 4, there are now two shorter recurrences that can be used to reconstruct any of the lost data elements. Both elements 680 and 685 are now the starting point (label 1) for a recurrence. It can be shown that for s=2 there is never a 2-failure case in which only one recurrence is required; this contrasts with the case s=1 where the loss of any pair of neighboring strips requires one long recurrence.

The two examples of FIG. 6 demonstrate yet another advantage of the flexible parameter ranges of the current invention; namely, by careful selection of the parameters certain reconstruction costs can be improved. In the example of FIG. 4, Case 1, there was one recurrence of length 4 and in Case 2, one recurrence of length 16. In the example of FIG. 6, Case 1, the recurrence of length 4 is divided into two recurrences of length 2 each and in Case 2 the recurrence of length 16 is divided into two recurrences of length 8 each.

It should be clear to someone skilled in the art that formulas (2), and (3) or (5) are not the only formulas that can be used to generate the strip of horizontal parity values and the row of vertical parity values in the present invention when h=1 and v=1. Other parity formulas or patterns, either regular (e.g., cyclic) or irregular are possible and are to be included within the scope of this invention.

Figure 7:
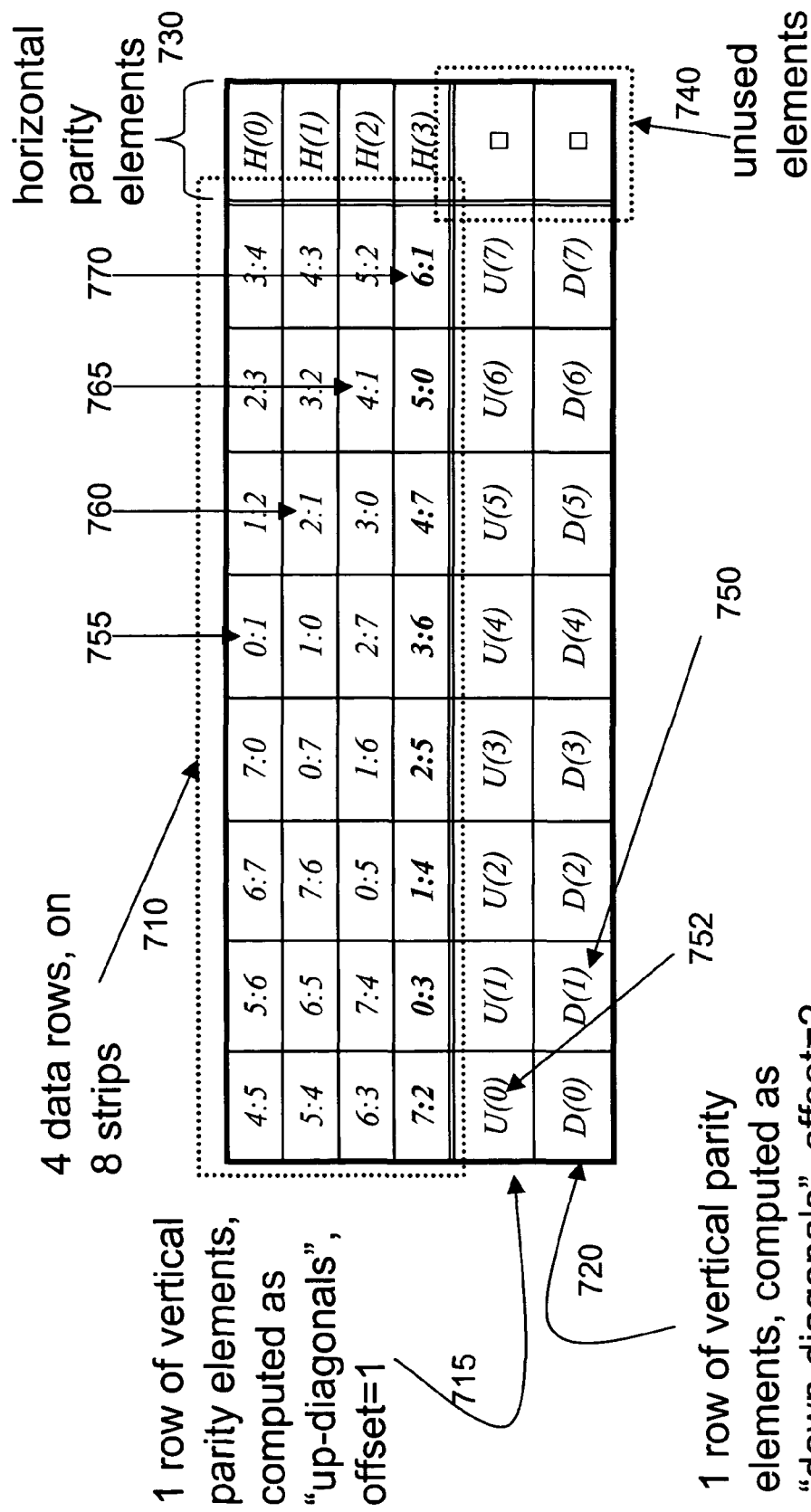
FIG. 7 is a diagram representing one exemplary embodiment of the present system that can tolerate three disk failures.

FIG. 7 shows another exemplary embodiment of the present system in which there is one horizontal parity strip (h=1) and two vertical parity rows (v=2) and that can tolerate 3 failed disks or strips. The horizontal parity elements 730 are computed by formula (2) as in FIGS. 3 and 5. The first row of parity elements 715 in FIG. 7 is computed by the formula (5) with the offset s=1 and comprises the "up-diagonal" parities. The second row of parity elements 720 in FIG. 7 is computed by the following formula with an offset t=2 and comprises the "down-diagonal" parities:

$$D(j) = \bigoplus_{i=0}^{r-1} X(i, \mod(j+i-r+1-t, n)). \quad (7)$$

There are four rows and 8 strips of data elements in the data substripe 710 of this example and there are two unused elements 740. Each data element is labeled with two tags, separated by a colon (:). The first tag to the left of the colon is the strip number j of the up-diagonal parity U(j) that the element touches. The second tag to the right of the colon is the strip number j of the down-diagonal parity D(j) that the element touches. For example, the element 770 with label "0:1" touches the up-diagonal parity U(0), 752, of strip 0 and the down-diagonal parity D(1) of strip 1. Formula (7) indicates that the down-diagonals parity values in the second parity row 720 are computed by the down-diagonals, with wrap-around from right to left, terminating in the last row of the data substripe, then placed t strips to the right (t=2 in FIG. 7) in the second parity row 720. For example, down-diagonal parity value D(1), 750, is computed from the data elements 755, 760, 765 and 770, as indicated by the "1" in the right half of the label for each of these elements.

The configuration in FIG. 7 can tolerate all combinations of 3 strip (or disk) failures. More generally, the HoVer layout with h=1 and v=2 and with parity values computed by formulas (2), (5) and (7) has 3-fault tolerance for some values of s in formula (5) and s in formula (7) and some range of values for r. It can be shown that there are restrictions on r beyond that given in the inequality in (1) as was the case for the exemplary layouts in FIGS. 3 and 5 when v=1. In this case, the restrictions are more complicated:

if pr(n)=2, then it must be the case that $r \leq n/2$, for any s and t; furthermore, if s=1 and t=2, then $r \leq n/2$ is sufficient;

if pr(n)=3 and 5 does not divide n, then it must be the case that $r \leq 2n/3-2$ for any s and t;

if pr(n)=3 and 5 divides n, then it must be the case that $r \leq 3n/5-3$ for any s and t;

if pr(n)≥5, then it must be the case that $r \leq n-n/pr(n)-1$ for any s and r; furthermore, it is conjectured that if s=t=n/pr(n)+1, then $r \leq n-n$; pr(n)-1 is sufficient.

These statements do not give complete necessary and sufficient conditions for when the HoVer layout with h=1 and v=2 and with parity values computed by formulas (2), (5) and (7) has 3-fault tolerance. In particular, the last statement only gives an upper bound, but in experiments, no counter examples were found for n≤120, which includes all practical ranges for n. The case where pr(n)=3 and 5 does not divide n is also incomplete, though for n≤600 and s=1 and t=3 the bound $r \leq 2n/3-3$ suffices.

Figure 8:
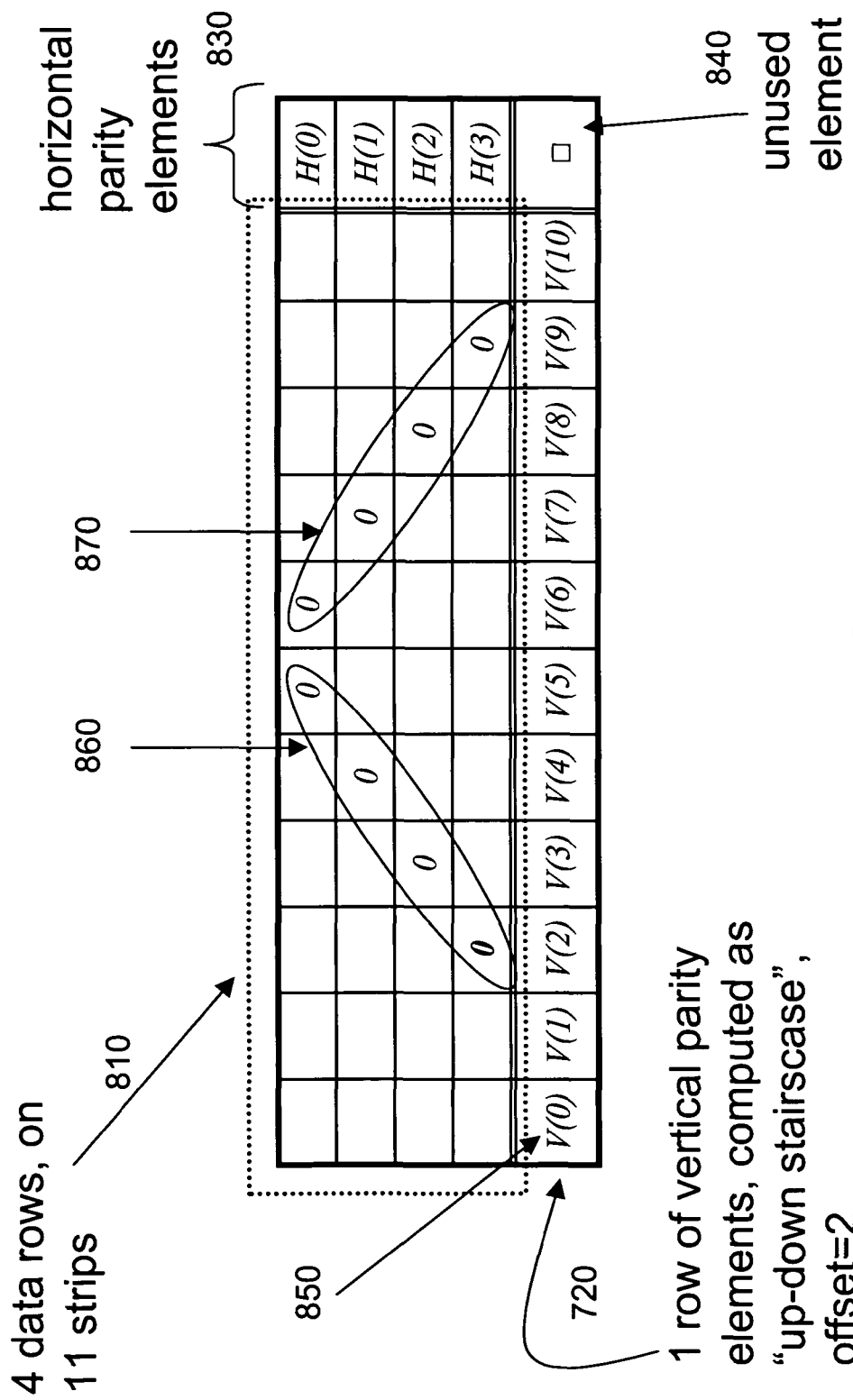
FIG. 8 is a diagram representing an alternative exemplary embodiment of the present system that can tolerate three disk failures, but has one fewer vertical parity row than the embodiment of FIG. 7.

In yet another exemplary HoVer layout, FIG. 8 shows an embodiment of the present system in which there is one horizontal parity strip (h=1) and one vertical parity row (v=1) and that can tolerate 3 failed disks or strips. This is the same general layout as in FIGS. 3 and 5 but has greater fault-tolerance. There is only one unused element, 840. The horizontal parity elements 830 are computed by formula (2) as in FIGS. 3 and 5. The vertical parity values 720 are computed by a "hill" pattern as indicated. The elements 860 on the up-diagonal and the elements 870 on the down-diagonal, all labeled with "0", are combined by XOR to compute the vertical parity V(0), 850, on the first strip. This pattern is repeated in a cyclic pattern to the right with wrap-around from right to left. In this example, the start of the up-diagonal for a given parity value is offset two strips to the right. In addition, the down-diagonal starts one strip offset to the right from the end of the up-diagonal. These two parameters allow for additional design flexibility. It can be seen by one skilled in the art that if this design has the required fault-tolerance for some values of r, n and two such offsets, then a design with the same value for n, the same value for up-diagonal offset, but with one less row and down-diagonal offset increased by 2 will also have the same fault-tolerance.

For the general HoVer layout that is exemplified in FIG. 8 with fault-tolerance 3, formula (1) says that $$r \leq \frac{n-3}{2} \text{ or equivalently, } n \geq 2r+3.$$

Additional restrictions also can occur. It appears that the largest value for r possible for a given value of n and any offsets is approximately half of the value possible for the layout exemplified in FIG. 7. Table 1 shows some maximal values of r that are possible with up-diagonal offset as indicated and down-diagonal offset equal to one (as exemplified by FIG. 8).

TABLE 1

Examples of system 100 embodied by FIG. 8.

| Maxr | n | Up-diag offset |
|---|---|---|
| 1 | 5, 6, 8 | 2 |
| 2 | 7, 9, 10, 12 | 2 |
| 3 | 14, 15 | 3 |
| 4 | 11, 18, 20 | 2 |
| 4 | 16 | 3 |
| 5 | 13 | 2 |
| 7 | 17 | 2 |
| 8 | 19 | 2 |

Figure 9:
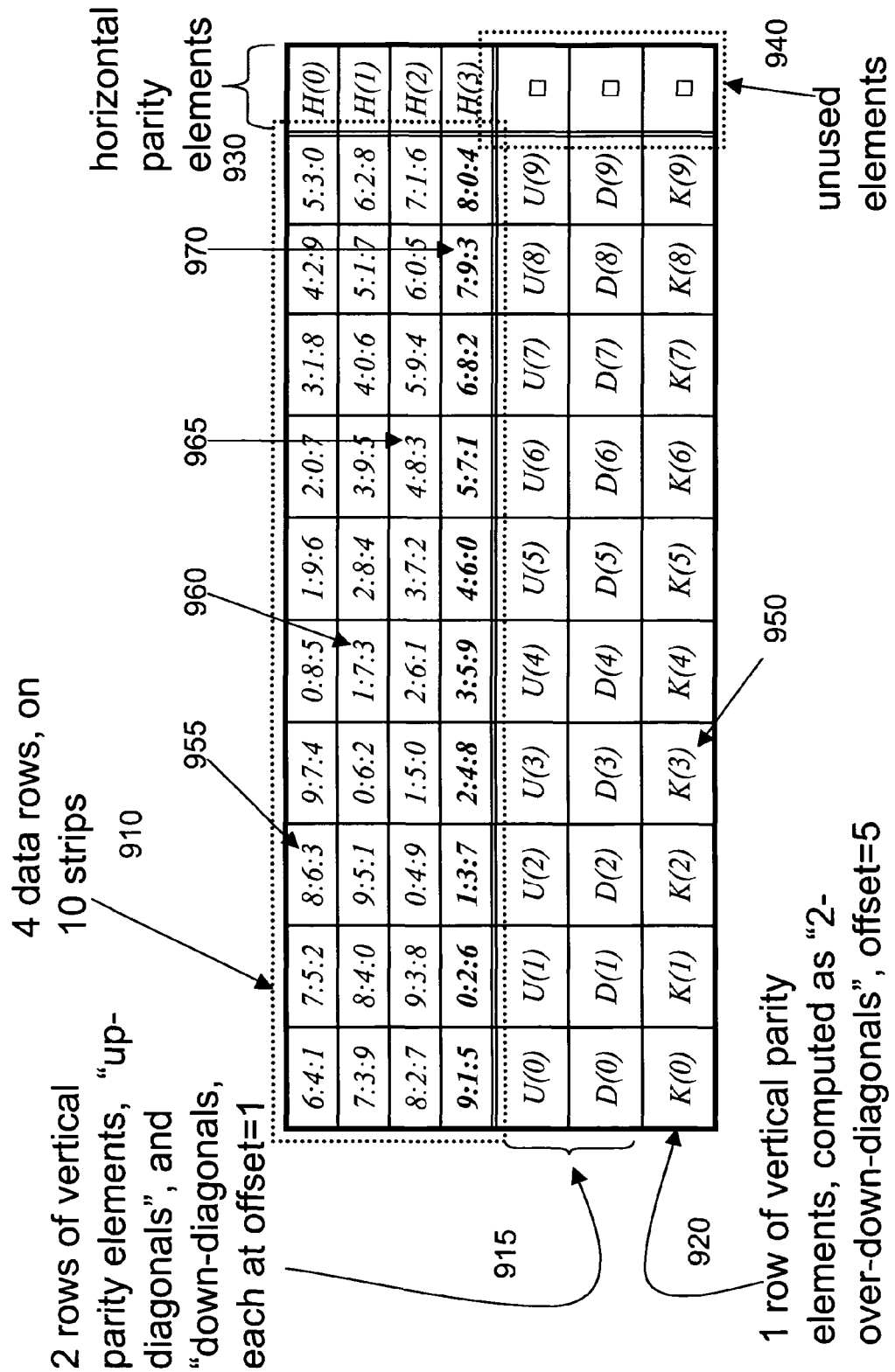
FIG. 9 is a diagram representing one exemplary embodiment of the present system that can tolerate four disk failures.

In still another exemplary HoVer layout, FIG. 9 shows an embodiment of the present system in which there is one horizontal parity strip (h=1) and one vertical parity row (v=3) and that can tolerate 4 failed disks or strips. This extends the general layout in FIG. 7 but has greater fault-tolerance. There are three unused elements, 940. The horizontal parity elements 930 are computed by formula (2) as before. The first two rows of vertical parity values 915 are computed by formulas (5) and (7), respectively, with offsets s=1 and t=1. The third row of vertical parity 920 is computed by a new formula that is visually a down-diagonal but the slope is −½, that is, down one and over two to the right (this is an example of the "knight's move" in chess). Mathematically, this is:

$$K(j) = \bigoplus_{i=0}^{r-1} X(i, \mod(j + 2(i - r + 1) - u, n)) \quad (8)$$

for some offset value u. In the exemplary layout of FIG. 9, the offset u=5. The elements in the data substripe 910 are labeled with three numbers, each separated by a colon (:). The first number in the label corresponds to the strip number of the up-diagonal parity element into which this data element is mapped. The second number in the label corresponds to the strip number of the down-diagonal parity element into which this data element is mapped. This is just as in FIG. 7. The third number in the label corresponds to the strip number of the knight's-diagonal parity element in the third parity row 920. For example, elements 955, 960, 965 and 970 each have third number equal to "3" in their label so they appear in the parity value K(3), 950. This pattern is repeated in a cyclic pattern to the right with wrap-around from right to left. These three offset parameters allow for additional design flexibility. It can be seen by one skilled in the art that if this design has the required 4-fault tolerance for some values of r, n and three offsets s, t, u, then a design with the same values for n, s, t, u, and any number of rows less than r will also have the same 4-fault-tolerance.

For the general HoVer layout that is exemplified in FIG. 9 with fault-tolerance 4, formula (1) says that $r \leq n-4$ or equivalently, $n \geq r+4$.

Additional restrictions also can occur. Table 2 shows some maximal values of r that are possible with offsets as indicated (other offsets may work for the same value of r—the table shows only one exemplary set of offsets for each specific cases).

TABLE 2

Examples of system 100 embodied by FIG. 9.

| Maxr | n | s, t, u |
|---|---|---|
| 1 | 5 or 6 | 1, 1, 2 |
| 2 | 7 | 1, 1, 4 |
| 2 | 8 | 1, 1, 3 |
| 3 | 9 | 1, 1, 3 |
| 4 | 10 | 1, 1, 5 |
| 5 | 11 | 1, 3, 4 |
| 7 | 13 | 5, 3, 6 |
| 6 | 14 | 1, 2, 2 |
| 5 | 15 | 1, 2, 2 |

The HoVer codes exemplified by FIGS. 7, 8 and 9 each have many of the properties of those exemplified by the examples in FIGS. 3 and 5. There is significant flexibility in parameter choices. There are no primality constraints on the parameters. In addition, for each design that works for some value of r, there is a modified design that works for every value of r'≦r. Smaller values for r provide more efficient reconstruction algorithms, particularly, when only one data strip is lost. For fixed r, as n increases, the layout can tolerate more combinations of failures where the number of failed strips exceeds the basic fault-tolerance (this value is 3 for FIGS. 7 and 8 and the value if 4 for FIG. 9). In addition, each design has the property that every data element touches exactly T parity elements, where T is the fault-tolerance of the erasure code.

It is to be understood that the specific embodiments of the invention that have been described are merely illustrative of certain applications of the principle of the present invention. Numerous modifications may be made to the system and method for tolerating multiple storage device failures in a storage system with HoVer layout described herein without departing from the spirit and scope of the present invention. Moreover, while the present invention is described for illustration purpose only in relation to fault-tolerant disk array system, it should be clear that the invention is applicable as well, for example, to any system in which the data and parity element layout is given in FIG. 2 and in which there are fault-tolerance greater than or equal to 2 and significant flexibility in parameter choices. Such other systems may have disk drives replaced by some other storage device or medium. Though the description herein is exemplified using the disk array, it should be clear to one skilled in the art that the invention can be extended to a network node application or other systems built from storage devices other than disks.

What is claimed is:

1. A processor-implemented method of protecting against concurrent failures occurring in at most T different storage devices in a group of N storage devices, comprising:

setting positive integers parameters n, r, v, h s, where n+h=N, v≧1, h≧1, T<n, and v+h≦T and $$r \leq v \frac{n-T}{T-h},$$

are valid based on the positive integers that have been set, and wherein the following condition is satisfied:

(a) T=2 and r<n−2, and wherein n is a prime number;

logically partitioning a portion of each of the storage devices into one strip spanning across a single storage device comprising the portion that has been logically partitioned;

organizing strips across the storage devices into a stripe;

designating n of the strips to each be a data and vertical parity strip;

designating h of the strips to each be a horizontal parity strip;

partitioning each of the data and vertical parity strips into r data elements and v vertical parity elements, wherein each data element is used to create at least T parity values;

partitioning each of the horizontal parity strips into at least r horizontal parity elements and a remainder of each of the horizontal parity strips as unused elements;

wherein for each vertical parity element and horizontal parity element, selecting a set of data elements from a collection of one or more data elements in the stripe so that:

(a) the selected set of data elements as a whole has not already been selected for another parity element, wherein each data element in the collection of one or more data elements is selected for a number of T different parity elements;

(b) storage devices of the selected data elements are different from the storage device of a parity element for which the set of data elements are being selected from the collection of one or more data elements in the stripe;

(c) wherein for each vertical parity element in a data and vertical parity strip, there is a sequence of selected sets of data elements from the stripe, wherein a first selected set in the sequence is a selected set for the vertical parity element and wherein each consecutive pair of selected sets in the sequence comprise a data element in common, and wherein a last selected set in the sequence comprises a data element in the data and vertical parity strip; and generating a parity value from data values stored in the data elements in the selected set of data elements and storing the parity value in the vertical parity element and the horizontal parity element, respectively.

2. The method of claim 1, wherein each data element and each parity element have a same size.

3. The method of claim 1, wherein the data storage devices comprise disks in an array of disks.

4. The method of claim 1, wherein the data storage devices are storage nodes in a network of storage devices.

5. The method of claim 1, further comprising assigning the data elements to sets of data elements for each parity element in a cyclic pattern.

6. The method of claim 1, further comprising computing parity values by XORing data blocks in the data elements of the selected set of data elements.

7. The method of claim 1, wherein selecting the set of data elements for one of the horizontal parity elements in each row comprises selecting all the data elements in a corresponding row of the data elements.

8. The method of claim 1, wherein selecting the set of data elements for at least one of the vertical parity elements from the stripe comprises following a sloped line through the data elements with wrap-around from right to left, with one data element selected from each row of data elements.

9. The method of claim 1, wherein selecting the set of data elements for at least one of the vertical parity elements from the stripe comprises following a sloped line up through the data elements then another sloped line down through the data elements with wrap-around from right to left, with one data element selected from each row on the up-sloped line and one data element from each row on the down-sloped line.

10. The method of claim 1, wherein a relative position of the vertical parity element to one of its selected data elements is shifted by an offset parameter.

11. The method of claim 1, wherein each data element belongs to exactly T parity element sets.

* * * * *